United States Patent [19]

Berecz et al.

[11] Patent Number: 4,752,996

[45] Date of Patent: Jun. 28, 1988

[54] INSERT INSTALLATION TOOL

[75] Inventors: Imre Berecz, El Toro; Robert C. Prisco, Anaheim, both of Calif.

[73] Assignee: Microdot Inc., Darien, Conn.

[21] Appl. No.: 828,544

[22] Filed: Feb. 12, 1986

[51] Int. Cl.[4] .............................................. B23P 19/04

[52] U.S. Cl. .......................................... 29/240; 29/252

[58] Field of Search .................... 269/32; 29/252, 240, 29/240.5, 254 R; 81/53.2, 57.44; 173/104, 169, 170

[56] References Cited

U.S. PATENT DOCUMENTS 2,929,134 3/1960 Mosher ................................ 29/240

3,245,137 4/1966 Neuschotz et al. .................. 29/240

4,347,754 9/1982 Wehler ................................ 269/32

*Primary Examiner*—Robert C. Watson

*Attorney, Agent, or Firm*—Lyman R. Lyon

[57] ABSTRACT

A tool for installing an externally threaded and keyed insert comprising a mandrel for the acceptance of an externally threaded insert. A cylindrical key-set sleeve is journaled on the mandrel and is movable axially thereof so as to bias the keys on the insert to the locked condition. An air chamber supports a piston that is movable upon the introduction of pressurized air into the air chamber to effect locking movement of the key-set sleeve.

3 Claims, 1 Drawing Sheet

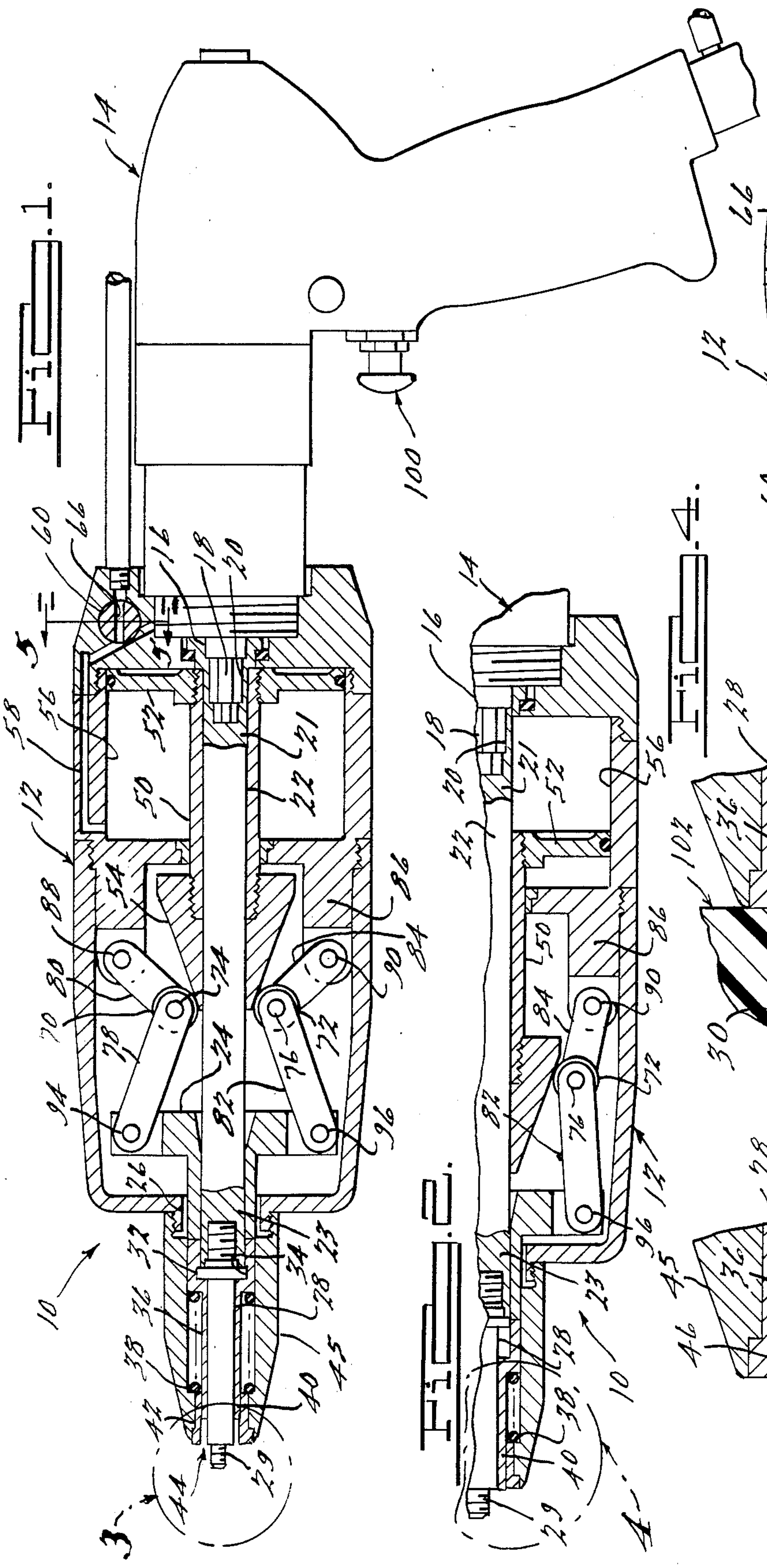
FIG. 1
FIG. 2
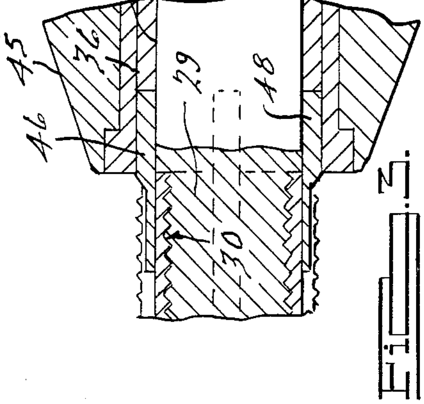
FIG. 3
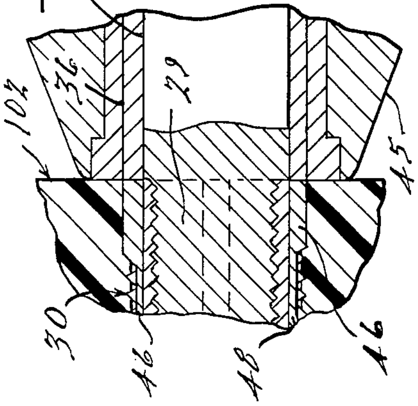
FIG. 4
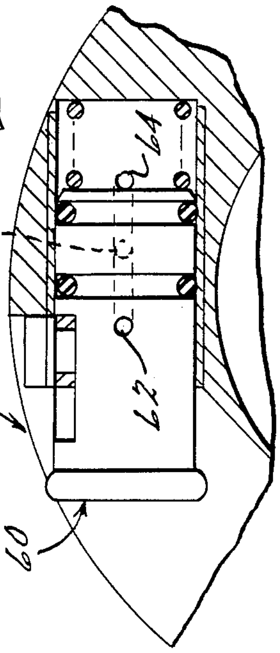
FIG. 5

INSERT INSTALLATION TOOL

BACKGROUND OF THE INVENTION

It is often necessary, particularly in the aircraft industry, to install a high strength externally and internally threaded insert in relatively soft material in order to increase the holding power of a fastener in the soft material. Such inserts often have longitudinally advanceable keys that mechanically lock the insert in the relatively soft material. Heretofore, the keys have been driven to the locked condition by a secondary operation which, in most instances, consists of merely hammering the keys into position.

SUMMARY OF THE INVENTION

The insert installation tool of the present invention features a novel air operated system that first drives a threaded insert to its installed condition then semi-automatically drives the keys of the threaded insert to the locked condition.

BRIEF DESCRIPTION OF THE DRAWINGS

FIG. 1 is a broken longitudinal section through an insert installation tool of the present invention;

FIG. 2 is a sectional view with the tool in the key-set condition;

FIG. 3 is a view taken within the circle "3" of FIG. 1 with an insert added;

FIG. 4 is a view taken within the circle "4" of FIG. 2 with an insert added; and FIG. 5 is a view taken along the line 5—5 of FIG. 1.

DETAILED DESCRIPTION OF THE PREFERRED EMBODIMENT OF THE INVENTION

Referring to FIG. 1 of the drawings, a preferred constructed embodiment of the insert installation tool 10 of the present invention comprises a housing 12 which is designed to be mounted on a conventional air or electrically powered drive power head, for example, a Rockwell Model #35F-436 pistol grip head 14. The head 14 has a conventional output shaft 16 extending outwardly thereof, a hexagonal end portion 18 thereof being dimensioned to be received in a complementary drive recess 20 in one end 21 of a drive shaft 22 of the tool 10.

An opposite end 23 of the drive shaft 22 is journaled in a slidable key drive bushing 24 which in turn is journaled in a fixed bushing 26 in the housing 12. The bushing 26 maintains the drive shaft 22 and slidable bushing 24 in coaxial relationship relative to the housing 12 and output shaft 16 of the power head 14.

The drive shaft 22 is provided with an extension 28 that is threadably secured thereto. The extension 28 has a threaded end portion 29 for the acceptance of an insert 30, as will be discussed.

A flanged end portion 32 of the shaft extension 28 is accepted in a complementary recess 34 in a tubular key-set sleeve 36. The sleeve 36 is normally biased toward the drive shaft 22 and into engagement with the flange 32 on the extension 28 by a spring 38. It is to be noted that an outer end portion 40 of sleeve 36 is journaled in a bushing 42 which is disposed radially outwardly of the key-set sleeve 36 thereby defining a cylindrical space 44 for the acceptance of the keys 46 and 48 of the insert 30, as will be described. The bushing 42 is supported by a nosepiece 45 which is threadably secured to the housing 12.

As best seen in FIG. 1 of the drawings, a sleeve 50 is slideably mounted on the drive shaft 22 for movement axially thereof. The sleeve 50 supports a piston 52 at one end thereof and a conical cam 54 at the other end thereof. The piston 52 is slideable in a cylinder 56 defined by the outer wall of the tool housing 12. Movement of the piston 52 in the cylinder 56 is achieved by admitting air through passageways communicating with opposite sides of the piston 52, namely, a passageway 58 for the admission of air from a control valve 60 to drive the piston 52 rearwardly toward the powerhead 14 and a passageway (not shown) communicating with the opposite side of the piston 52 from the control valve 60.

The control valve 60 is manually movable laterally of the tool housing 12 to affect control of the piston 52. As best seen in FIG. 5 of the drawings, the valve 60 is of conventional construction and comprises a pair of air outlet passages 62 and 64 that communicate with an air inlet passage 66. The valve 60 in its normal or relaxed position allows a constant flow of air into passageway 58 which communicates with the front side of the piston 52. Movement of the valve 60 laterally of the housing 12 affects admission of air into a passageway (not shown) leading to the rear side of the piston 52 and also shutting off flow of air to the front side of the piston 52.

As best seen by comparing FIGS. 1 and 2 of the drawings, the cam 54 is engageable with a pair of rollers 70 and 72 that are mounted on pins 74 and 76, respectively. The pins 74 and 76 join pairs of links 78-80 and 82-84, respectively. The links 80 and 84 are pivotally mounted in a transverse bulkhead 86 of the housing 12 by pins 88 and 90, respectively. The links 78 and 82 are pivotally secured to the bushing 24 by pins 94 and 96.

In operation, an insert 30 is manually threaded onto the end portion 29 of the shaft extension 28. Note that, as seen in FIG. 3, the keys 46 and 48 are accepted in the cylindrical space between the drive shaft extension 28 and the bushing 42. After assembly of the insert 30 on the drive shaft extension 28, the power head 14 is energized as by actuation of a conventional control valve 100 thereon, effecting rotation of the drive shaft 22, shaft extension 28 and insert 30 relative to a workpiece 102 and advancement of the insert 30 thereinto. When the insert 30 is fully advanced into the workpiece 102, the power head 14 stalls, signaling that the keys 46 and 48 are in condition to be driven to the locking condition. Locking of the insert 30 is achieved by actuation of the valve 60 which drives the piston 52, sleeve 50, and cam 54 to the left as seen in FIGS. 1 and 2 of the drawing. As best seen in FIG. 2, advancement of the cam 54 results in radially outward movement f the rollers 70 and 72 resulting in outward articulation or toggling of the links 78-80 and 82-84. The aforesaid movement imparts a significant mechanical advantage to axial movement of the bushing 24 along the drive shaft 22. Movement of the bushing 24 is transmitted to the key-set sleeve 36 which bears upon the keys 46 and 48 driving the keys 46 and 48 to the set position illustrated in FIG. 4 of the drawings.

From the aforesaid description, it should be apparent that the tool of the instant invention provides for both insertion of an insert into a complementary aperture in a workpiece and driving of the retention keys of the insert into a final installed condition. Driving of the insert keys is accomplished by an operation that is essentially continuous after rotation of the insert to its installed condition.

While the preferred embodiment of the invention has been disclosed, it should be appreciated that the invention is susceptible of modification without departing from the scope of the following claims.

We claim:

1. A tool for installing an externally threaded and keyed insert comprising:
  - a housing;
  - a mandrel in said housing for the acceptance of said externally threaded insert,
  - means for rotating said mandrel,
  - a non-rotatable cylindrical key-set sleeve journaled on said mandrel and movable axially relative thereto for biasing the keys on said insert to the locked condition,
  - an air chamber in said housing, and
  - a piston in said air chamber movable upon the introduction of pressurized air into said air chamber to effect locking movement of said key-set sleeve.

2. A tool in accordance with claim 1 wherein said piston includes a conical cam, and a toggle mechanism engageable by said cam for biasing said key-set sleeve to the locked condition.

3. A tool in accordance with claim 1 wherein said mandrel has an externally threaded portion for the acceptance of said insert.

* * * * *